US012759350B2

(12) United States Patent
Yuan

(10) Patent No.: US 12,759,350 B2
(45) Date of Patent: Oct. 13, 2026

(54) TIRE PARAMETER MONITORING APPARATUS, METHOD, AND SYSTEM

(71) Applicant: HUAWEI TECHNOLOGIES CO., LTD., Shenzhen (CN)

(72) Inventor: Shutian Yuan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 716 days.

(21) Appl. No.: 17/946,572

(22) Filed: Sep. 16, 2022

(65) Prior Publication Data

US 2023/0018363 A1 Jan. 19, 2023

Related U.S. Application Data

(63) Continuation of application No. PCT/CN2020/079586, filed on Mar. 17, 2020.

(51) Int. Cl.
*B60C 23/04* (2006.01)

(52) U.S. Cl.
CPC ...... *B60C 23/0486* (2013.01); *B60C 23/0408* (2013.01)

(58) Field of Classification Search
CPC ............ B60C 23/0486; B60C 23/0408; B60C 23/0428; B60C 23/0449; B60C 23/04
See application file for complete search history.

(56) References Cited

U.S. PATENT DOCUMENTS

2003/0234722 A1 12/2003 Lonsdale et al.
2007/0279188 A1 12/2007 Thiesen et al.
2008/0042819 A1* 2/2008 Masudaya ........... B60C 23/0449 340/447
2009/0033480 A1* 2/2009 Tanemura ........... B60C 23/0408 340/447

FOREIGN PATENT DOCUMENTS

CN 1340007 A 3/2002
CN 1619954 A 5/2005
CN 101348059 A 1/2009

(Continued)

OTHER PUBLICATIONS

Office Action in Chinese Appln. No. 202080004608.5, dated Aug. 25, 2021, 14 pages (with English translation).

(Continued)

*Primary Examiner* — Yossef Korang-Beheshti
(74) *Attorney, Agent, or Firm* — Fish & Richardson P.C.

(57) ABSTRACT

A tire parameter monitoring apparatus, method, and system are provided. The apparatus includes a receiver, a processor, and an output circuit. The receiver may be configured to receive an excitation signal. The processor may be configured to obtain resonance frequency information of a tire, wherein the resonance frequency information of the tire is related to a monitoring parameter of the tire. The output circuit may be configured to reflect an output signal in response to the excitation signal. The output parameter of the output signal is obtained based on the resonance frequency information of the tire, and the output signal is used to obtain the monitoring parameter of the tire based on the output parameter of the output signal.

15 Claims, 8 Drawing Sheets

(56) References Cited

FOREIGN PATENT DOCUMENTS

| | | | | |
|---|---|---|---|---|
| CN | 103832225 | A | | 6/2014 |
| CN | 106134105 | A | | 11/2016 |
| EP | 1839911 | A2 | | 10/2007 |
| EP | 1849629 | A2 | | 10/2007 |
| FR | 2551556 | A1 | | 3/1985 |
| JP | 2001071724 | A | * | 3/2001 |
| WO | 0145967 | A1 | | 6/2001 |

OTHER PUBLICATIONS

Extended European Search Report in European Appln No. 20926196.5, dated Mar. 13, 2023, 6 pages.

International Search Report and Written Opinion in International Appln. No. PCT/CN2020/079586, mailed on Dec. 18, 2020, 17 pages (with English translation).

EP Communication Pursuant to Article 94(3) EPC in European Appln. No. 20926196.5 , mailed on Feb. 11, 2025, 7 pages.

* cited by examiner

TIRE PARAMETER MONITORING APPARATUS, METHOD, AND SYSTEM

CROSS-REFERENCE TO RELATED APPLICATIONS

This application is a continuation of International Application No. PCT/CN2020/079586, filed on Mar. 17, 2020, the disclosure of which is hereby incorporated by reference in its entirety.

TECHNICAL FIELD

This application relates to the monitoring field, and in particular, to a tire parameter monitoring apparatus, method, and system.

BACKGROUND

A tire failure of an automobile is a main cause of serious traffic accidents. Serious faults such as a tire pressure loss and tire leakage can be found and warned in advance through tire pressure monitoring.

Currently, a tire pressure monitoring system on the market mainly includes two parts. One part is a wireless pressure and temperature detection module installed in a tire of an automobile, and the other part is a display and alarm system. The pressure and temperature detection module transmits a detection signal in a wireless manner. After receiving tire data, the display and alarm system correspondingly processes the data, then may intuitively display the data on the screen, and warns and prompts a driver when the tire is abnormal.

The pressure and temperature detection module in the tire pressure monitoring system is installed in a harsh environment of the tire, and has very strict requirements on a volume and power consumption. Although a wireless monitoring and transmission module with a battery has become increasingly mature currently with development of technologies, there are still many stability problems, and an environment still has great impact on performance of the tire pressure monitoring system.

SUMMARY

This application provides a tire parameter monitoring apparatus, method, and system, to implement passive tire pressure monitoring, reduce production and use costs of the tire pressure monitoring system, and improve reliability of the monitoring system.

According to a first aspect, a tire parameter monitoring apparatus is provided. The apparatus may include: a receiving unit, configured to receive an excitation signal; a processing unit, configured to obtain resonance frequency information of a tire, where the resonance frequency information of the tire is related to a monitoring parameter of the tire; and an output unit, configured to reflect an output signal in response to the excitation signal, where an output parameter of the output signal is obtained based on the resonance frequency information of the tire, and the output signal is used to obtain the monitoring parameter of the tire based on the output parameter of the output signal.

For example, the tire parameter monitoring apparatus may be a transistor microwave amplification by stimulated emission of radiation (Microwave Amplification by Stimulated Emission of Radiation, MASER) (or a maser), or the tire parameter monitoring apparatus may be a passive tire pressure monitoring device sensor manufactured based on a transistor MASER.

For example, the resonance frequency information of the tire is related to the monitoring parameter of the tire, that is, it indicates that the monitoring parameter of the tire affects a resonance frequency, and different monitoring parameters may correspond to different resonance frequencies. That the processing unit is configured to obtain the resonance frequency information of the tire may also mean that the processing unit obtains the monitoring parameter of the tire.

For example, that the output parameter of the output signal is obtained based on the resonance frequency information of the tire may mean that the output parameter of the reflected output signal (or output information) is related to the resonance frequency, that is, the output parameter of the reflected output signal depends on the resonance frequency. For example, different resonance frequencies may correspond to different output parameters of the reflected output signal.

For example, the apparatus is a sensor. For example, the apparatus is a tire pressure sensor.

Based on the foregoing technical solution, the apparatus in a passive state can transmit, based on a feature that the output signal is generated through radio frequency excitation and by using the excitation signal and the output signal, parameters monitored in real time to a device (for example, denoted as a second device) that needs to learn of these monitoring parameters. For example, the output parameter of the output signal is related to the resonance frequency, and the resonance frequency is related to the monitoring parameter of the tire. Therefore, the output parameter of the output signal may reflect the monitoring parameter of the tire. Therefore, the second device may obtain the monitoring parameter of the tire based on the received output signal, and may further perform corresponding processing based on the monitoring parameter of the tire. In this manner, not only production and use costs of a monitoring system (for example, a tire pressure monitoring system) can be reduced, but also a battery does not need to be used at a monitoring end, so that reliability of the system can be enhanced.

With reference to the first aspect, in some implementations of the first aspect, the output parameter of the output signal includes one or more of the following: a frequency of the output signal, an amplitude of the output signal, and a phase of the output signal.

In an example, the frequency of the output signal is obtained based on the resonance frequency information of the tire, and the output signal is used to obtain the monitoring parameter of the tire based on the frequency of the output signal.

In another example, the amplitude of the output signal is obtained based on the resonance frequency information of the tire, and the output signal is used to obtain the monitoring parameter of the tire based on the amplitude of the output signal.

In still another example, the phase of the output signal is obtained based on the resonance frequency information of the tire, and the output signal is used to obtain the monitoring parameter of the tire based on the phase of the output signal.

With reference to the first aspect, in some implementations of the first aspect, the resonance frequency information of the tire is obtained based on the monitoring parameter that is of the tire and that is monitored by a pressure sensitive element.

For example, the resonance frequency information of the tire is obtained from a peripheral circuit, and the peripheral circuit may obtain the resonance frequency information of the tire based on the monitoring parameter that is of the tire and that is monitored by the pressure sensitive element. The periphery circuit may be, for example, a capacitor or an inductor.

With reference to the first aspect, in some implementations of the first aspect, the frequencies of the output signal and the excitation signal are different.

Optionally, a spacing between the frequencies of the output signal and the excitation signal may be preset, as specified in a protocol in advance.

Based on the foregoing technical solution, the frequencies of the excitation signal and the output signal are different. For example, the spacing between the frequencies of the output signal and the excitation signal may be set. For example, a sufficiently large spacing between the frequencies may be set. In this way, it can be ensured that a frequency of the reflected output signal is different from a frequency of the excitation signal. Therefore, mutual interference between the excitation signal and the output signal can be avoided, and accuracy of a monitoring result can be improved.

With reference to the first aspect, in some implementations of the first aspect, the monitoring parameter of the tire includes one or more of the following: pressure, temperature, and acceleration.

According to a second aspect, a tire parameter obtaining apparatus is provided. The apparatus may include: a receiving unit, configured to receive an output signal; a processing unit, configured to obtain a monitoring parameter of a tire based on an output parameter of the output signal, where the output parameter of the output signal is obtained based on resonance frequency information of the tire, and the resonance frequency information of the tire is related to the monitoring parameter of the tire.

For example, the apparatus is a sensor. For example, the apparatus is a tire pressure sensor.

Based on the foregoing technical solution, a second device (that is, a device that needs to learn of the monitoring parameter of the tire) may learn of, by using the output signal generated through radio frequency excitation, for example, the output parameter of the output signal, parameters monitored in real time. In this manner, not only production and use costs of a monitoring system (for example, a tire pressure monitoring system) can be reduced, but also a battery does not need to be used at a monitoring end, so that reliability of the system can be enhanced.

With reference to the second aspect, in some implementations of the second aspect, the output parameter of the output signal includes one or more of the following: a frequency of the output signal, an amplitude of the output signal, and a phase of the output signal.

With reference to the second aspect, in some implementations of the second aspect, the monitoring parameter of the tire includes one or more of the following: pressure, temperature, and acceleration.

With reference to the second aspect, in some implementations of the second aspect, the apparatus may include a transmission unit, configured to output an excitation signal.

According to a third aspect, a tire parameter monitoring apparatus is provided. The apparatus may include: a transistor microwave amplification by stimulated emission of radiation MASER, configured to receive an excitation signal; and a peripheral circuit, configured to send resonance frequency information of a tire to the transistor MASER, where the resonance frequency information of the tire is related to a monitoring parameter of the tire. The transistor MASER is further configured to reflect an output signal in response to the excitation signal, where an output parameter of the output signal is obtained based on the resonance frequency information of the tire, and the output signal is used to obtain the monitoring parameter of the tire based on the output parameter of the output signal.

For example, the apparatus is a sensor. For example, the apparatus is a tire pressure sensor. For example, the tire parameter monitoring apparatus may be a passive tire pressure monitoring device sensor manufactured based on a transistor MASER. For example, the apparatus may further include a pressure sensitive element.

Based on the foregoing technical solution, the apparatus in a passive state can transmit, based on a feature that the output signal is generated through radio frequency excitation and by using the excitation signal and the output signal, the parameters monitored in real time to a device (for example, denoted as a second device) that needs to learn of these monitoring parameters. For example, the output parameter of the output signal reflected by the transistor MASER is related to a resonance frequency, and the resonance frequency is related to the monitoring parameter of the tire. Therefore, the output parameter of the output signal may reflect the monitoring parameter of the tire. Therefore, the second device may obtain the monitoring parameter of the tire based on the received output signal, and may further perform corresponding processing based on the monitoring parameter of the tire. In this manner, not only production and use costs of a monitoring system (for example, a tire pressure monitoring system) can be reduced, but also a battery does not need to be used at a monitoring end, so that reliability of the system can be enhanced.

With reference to the third aspect, in some implementations of the third aspect, the output parameter of the output signal includes one or more of the following: a frequency of the output signal, an amplitude of the output signal, and a phase of the output signal.

With reference to the third aspect, in some implementations of the third aspect, the peripheral circuit is specifically configured to send the resonance frequency information of the tire to the transistor MASER based on the monitoring parameter that is of the tire and that is monitored by the pressure sensitive element.

With reference to the third aspect, in some implementations of the third aspect, frequencies of the output signal and the excitation signal are different.

With reference to the third aspect, in some implementations of the third aspect, the monitoring parameter of the tire includes one or more of the following: pressure, temperature, and acceleration.

According to a fourth aspect, a tire parameter monitoring method is provided. The method may include: receiving an excitation signal; obtaining resonance frequency information of a tire, where the resonance frequency information of the tire is related to a monitoring parameter of the tire; and reflecting an output signal in response to the excitation signal, where an output parameter of the output signal is obtained based on the resonance frequency information of the tire, and the output signal is used to obtain the monitoring parameter of the tire based on the output parameter of the output signal.

With reference to the fourth aspect, in some implementations of the fourth aspect, the output parameter of the output signal includes one or more of the following: a frequency of the output signal, an amplitude of the output signal, and a phase of the output signal.

With reference to the fourth aspect, in some implementations of the fourth aspect, the receiving an excitation signal includes: receiving N excitation signals, where N is an integer greater than 1 or equal to 1; and the reflecting an output signal based on the excitation signal includes: reflecting N output signals based on the N excitation signals.

With reference to the fourth aspect, in some implementations of the fourth aspect, the receiving an excitation signal includes: receiving the N excitation signals, where N is the integer greater than 1 or equal to 1, and the reflecting an output signal in response to the excitation signal includes reflecting the N output signals based on the N excitation signals.

With reference to the fourth aspect, in some implementations of the fourth aspect, frequencies of the N excitation signals are the same, and frequencies of the N output signals are different; or the frequencies of the N excitation signals are different, and the frequencies of the N output signals are different; or the frequencies of the N excitation signals are different, and the frequencies of the N output signals are the same.

With reference to the fourth aspect, in some implementations of the fourth aspect, frequencies of the output signal and the excitation signal are different.

With reference to the fourth aspect, in some implementations of the fourth aspect, the monitoring parameter of the tire includes one or more of the following: pressure, temperature, and acceleration.

According to a fifth aspect, a tire parameter obtaining method is provided. The method may include: receiving an output signal; and obtaining a monitoring parameter of a tire based on an output parameter of the output signal, where the output parameter of the output signal is obtained based on resonance frequency information of the tire, and the resonance frequency information of the tire is related to the monitoring parameter of the tire.

With reference to the fifth aspect, in some implementations of the fifth aspect, the monitoring parameter of the tire includes one or more of the following: pressure, temperature, and acceleration.

With reference to the fifth aspect, in some implementations of the fifth aspect, before the receiving an output signal, the method may further include: outputting an excitation signal.

According to a sixth aspect, a tire parameter monitoring system is provided. The system may include N tire parameter monitoring apparatuses according to any one of the first aspect to the third aspect, where N is an integer greater than 1 or equal to 1.

With reference to the sixth aspect, in some implementations of the sixth aspect, frequencies of excitation signals received by some or all of the N apparatuses are the same, and frequencies of reflected output signals are different.

Based on the foregoing technical solution, a same excitation signal may be used for excitation at a same moment, and information (for example, information about a parameter such as pressure or temperature) monitored by the apparatuses is simultaneously read. Excitation signals having a same frequency and output signals having different frequencies are used, that is, the frequencies of the output signals of the apparatuses may be different. Therefore, processing can be performed simultaneously without interfering with each other, to improve a reading speed. A tire of an automobile is used as an example. The automobile has a plurality of tires. In this implementation, it can be ensured that sensor information of the plurality of tires is read at a fast speed.

With reference to the sixth aspect, in some implementations of the sixth aspect, the frequencies of the excitation signals received by some or all of the N apparatuses are different, and the frequencies of the reflected output signals are different.

Based on the foregoing technical solution, the system is simple and easily implemented, and has a low requirement on a processing capability. In addition, a second device (that is, a device that needs to learn of a monitoring parameter of a tire) may read the apparatuses based on a requirement, that is, the second device may read the apparatuses in any sequence. Alternatively, the second device may excite and process, based on a requirement, only one or more signals output by one or more apparatuses, so that a working procedure can be set more flexibly, and information can be processed more flexibly.

With reference to the sixth aspect, in some implementations of the sixth aspect, the frequencies of the excitation signals received by some or all of the N apparatuses are different, and the frequencies of the reflected output signals are the same.

Based on the foregoing technical solution, the system is simple and easily implemented, and has a low requirement on a processing capability. In addition, the second device may read the apparatuses based on a requirement, that is, the second device may read the apparatuses in any sequence.

According to a seventh aspect, a tire parameter monitoring system is provided. The tire parameter monitoring system includes a tire parameter monitoring apparatus and a tire parameter obtaining apparatus. The tire parameter monitoring apparatus is configured to: receive an excitation signal; obtain resonance frequency information of a tire, where the resonance frequency information of the tire is related to a monitoring parameter of the tire; and reflect an output signal in response to the excitation signal, where an output parameter of the output signal is obtained based on the resonance frequency information of the tire, and the output signal is used to obtain the monitoring parameter of the tire based on the output parameter of the output signal. The tire parameter obtaining apparatus is configured to: receive the output signal, and obtain the monitoring parameter of the tire based on the output parameter of the output signal.

With reference to the seventh aspect, in some implementations of the seventh aspect, the output parameter of the output signal includes one or more of the following: a frequency of the output signal, an amplitude of the output signal, and a phase of the output signal.

With reference to the seventh aspect, in some implementations of the seventh aspect, the monitoring parameter of the tire includes one or more of the following: pressure, temperature, and acceleration.

With reference to the seventh aspect, in some implementations of the seventh aspect, the tire parameter monitoring apparatus is the tire parameter monitoring apparatus according to any one of the first aspect to the third aspect, and the tire parameter obtaining apparatus is the tire parameter obtaining apparatus according to the second aspect.

According to an eighth aspect, a method for a tire parameter monitoring system is provided. The tire parameter monitoring system includes a tire parameter monitoring apparatus and a tire parameter obtaining apparatus. The method includes: The tire parameter monitoring apparatus receives an excitation signal. The tire parameter monitoring apparatus obtains resonance frequency information of a tire, where the resonance frequency information of the tire is related to a monitoring parameter of the tire. The tire parameter monitoring apparatus reflects an output signal in response to the excitation signal, where an output parameter of the output signal is obtained based on the resonance frequency information of the tire, and the output signal is used to obtain the monitoring parameter of the tire based on the output parameter of the output signal. The tire parameter obtaining apparatus receives the output signal, and obtains the monitoring parameter of the tire based on the output parameter of the output signal.

With reference to the eighth aspect, in some implementations of the eighth aspect, the output parameter of the output signal includes one or more of the following: a frequency of the output signal, an amplitude of the output signal, and a phase of the output signal.

With reference to the eighth aspect, in some implementations of the eighth aspect, the monitoring parameter of the tire includes one or more of the following: pressure, temperature, and acceleration.

With reference to the eighth aspect, in some implementations of the eighth aspect, the tire parameter monitoring apparatus is the tire parameter monitoring apparatus according to any one of the first aspect to the third aspect, and the tire parameter obtaining apparatus is the tire parameter obtaining apparatus according to the second aspect.

According to a ninth aspect, an automobile is provided, and includes the tire parameter monitoring apparatus according to any one of the first aspect to the third aspect, or an apparatus configured to perform the method according to any one of the fourth aspect, the fifth aspect, and the eighth aspect, or the tire parameter monitoring system according to the sixth aspect or the seventh aspect.

DESCRIPTION OF EMBODIMENTS

The following describes technical solutions of this application with reference to accompanying drawings.

The technical solutions in embodiments of this application may be applied to a scenario in which a parameter needs to be monitored, for example, a scenario in which pressure or another parameter of a moving object needs to be monitored. For example, the technical solutions in embodiments of this application may be applied to various automobiles and wheel machinery that requires a tire pressure monitoring function, for example, monitoring of automobile tire pressure in a driving state and monitoring of automobile tire pressure in a driving state.

Power usually needs to be supplied by a battery to an existing tire pressure monitoring system (tire pressure monitoring system, TPMS). A monitoring apparatus may be disposed inside or outside the TPMS. It is very inconvenient to replace a battery of the built-in monitoring apparatus. This requires a professional operation, and consequently labor costs are high. The external monitoring apparatus is easily lost and damaged. A tire needs to adapt to a harsh working environment, and reliability of the battery affects adaptability of the tire pressure monitoring system. In addition, production and recycling of the battery cause serious environmental protection pressure.

In view of this, this application provides a tire parameter monitoring method, so that not only passive monitoring can be implemented, but also monitoring reliability can be improved.

The following describes, in detail with reference to the accompanying drawings, embodiments provided in this application.

Figure 1:
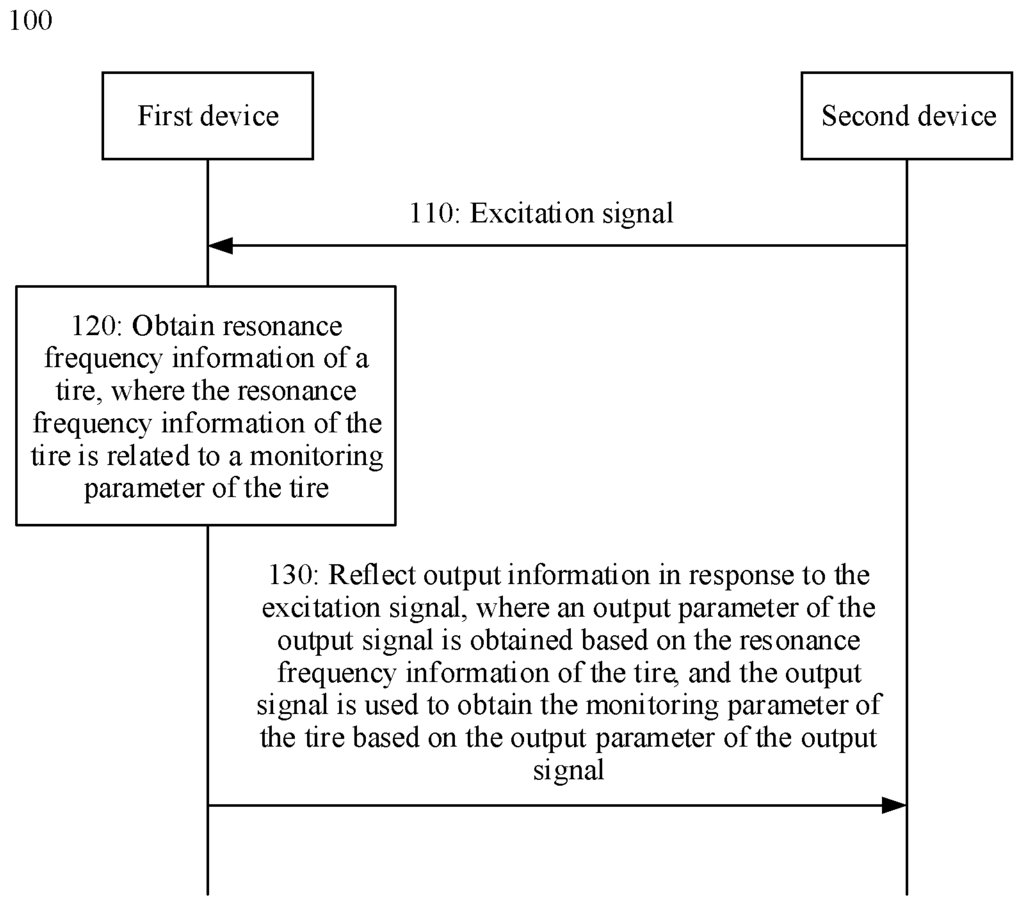
FIG. 1 is a schematic block diagram of a tire parameter monitoring method according to an embodiment of this application.

FIG. 1 is a schematic block diagram of a tire parameter monitoring method 100 according to an embodiment of this application. The method 100 may include the following steps.

110: A first device receives an excitation signal. Correspondingly, a second device sends the excitation signal.

For example, the excitation signal may not carry any data. After being excited by using the excitation signal, the first device may reflect an output signal in response to the excitation signal.

Optionally, the first device may be, for example, a tire pressure sensor installed on an automobile tire. In other words, all first devices in the following descriptions may be replaced with the tire pressure sensor. For example, the tire pressure sensor may be integrated inside the tire, for example, near a valve core, that is, a location at which air is contained inside the tire, and is no longer exposed, so that a loss and damage can be avoided. It should be understood that a specific location of the tire pressure sensor is not limited in this application.

In a possible implementation, the first device (or may be referred to as a monitoring device or a tire parameter monitoring apparatus) may include a passive tire pressure monitoring device sensor manufactured based on a transistor microwave amplification by stimulated emission of radiation (Microwave Amplification by Stimulated Emission of Radiation, MASER) (or a maser).

For example, in this implementation, the first device may include a pressure sensitive device and the transistor MASER. The entire MASER is based on an enhanced pseudomorphic high electron mobility transistor. An output frequency of the MASER may be determined based on a design of a peripheral circuit, for example, may be determined based on parameters of the peripheral circuit of the transistor, for example, a value of a device such as a capacitor, an inductor, or a resistor.

It should be understood that the transistor MASER is merely an example for description, and any transistor that can implement this solution falls within the protection scope of embodiments of this application. The following mainly uses the transistor MASER as an example for description.

Optionally, the second device may include, for example, a receiving and processing unit installed in an automobile body, which may be configured to receive tire data.

In a possible implementation, the second device may include parts such as a radio frequency transmitter and receiver, a microprocessor, and a power supply.

For example, a tire pressure monitoring system may include the first device and the second device. It should be understood that the tire pressure monitoring system may further include another device, for example, a duplexer. This is not limited herein.

It should be understood that the first device and the second device are merely names for differentiation, and do not constitute any limitation on the protection scope of embodiments of this application.

It should be further understood that the first device and the second device may be different devices, or may be integrated into a same device. This is not limited herein.

It should be further understood that specific forms of the first device and the second device, a quantity of first devices, and a quantity of second devices are merely examples for description. This is not limited in this embodiment of this application. For example, an automobile usually has a plurality of tires, one first device may be installed on each tire, and the first device on each tire may be configured to collect a parameter of the tire.

Before the first device reflects the output signal based on the excitation signal, the first device may further obtain resonance frequency information of the tire, and determine, based on the resonance frequency information, a frequency of the reflected output signal.

120: The first device obtains the resonance frequency information of the tire, where the resonance frequency information of the tire is related to a monitoring parameter of the tire.

In a possible implementation, after being excited by using the excitation signal, the first device may monitor the monitoring parameter of the tire, where the monitoring parameter of the tire is related to the resonance frequency information of the tire. Therefore, the first device may obtain the resonance frequency information of the tire based on the monitoring parameter of the tire.

For example, the monitoring parameter of the tire (briefly referred to as the monitoring parameter below) may include but is not limited to one or more of the following: pressure, temperature, and acceleration.

Optionally, the first device may process obtained (or collected, read, or the like) monitoring parameter.

The first device may convert the obtained monitoring parameter, for example, a physical quantity such as the pressure, the temperature, or the acceleration, into a modulation quantity. In addition, the first device may modulate the modulation quantity to the reflected output signal.

In this embodiment of this application, modulating the monitoring parameter to the output signal may mean that the output parameter of the output signal may reflect the monitoring parameter, that is, the output parameter of the output signal depends on the monitoring parameter. Specifically, for example, the first device monitors the monitoring parameter of the tire, and determines a resonance frequency based on the monitored monitoring parameter, where the resonance frequency may affect the output parameter of the output signal. Therefore, the first device may determine the output parameter of the output signal based on the resonance frequency. It may be understood that the output parameter of the output signal reflected by the first device may reflect the monitored monitoring parameter, for example, reflect a change of the pressure, the temperature, or the like of the tire. Alternatively, it may be understood that the output parameter of the output signal reflected by the first device is determined based on the monitoring parameter. Alternatively, it may be understood that the first device may reflect the output signal based on the monitored monitoring parameter, where the output parameter of the reflected output signal is determined based on the monitored monitoring parameter.

For example, the first device is a passive tire pressure sensor manufactured based on the MASER. For example, a pressure sensitive element in the sensor monitors the monitoring parameter of the tire, the peripheral circuit of the transistor MASER determines the resonance frequency based on the monitoring parameter monitored by the pressure sensitive element, and the transistor MASER determines the output parameter of the reflected output signal based on the resonance frequency of the peripheral circuit.

For example, the output parameter of the output signal may include but is not limited to one or more of the following: a frequency of the output signal, an amplitude of the output signal, and a phase of the output signal. The pressure is used as an example. For example, a change of the pressure may be modulated to the frequency of the output signal, that is, the frequency of the output signal may reflect the change of the pressure. For another example, the change of the pressure may be modulated to the amplitude of the output signal, that is, the amplitude of the output signal may reflect the change of the pressure. For another example, the change of the pressure may be modulated to the phase of the output signal, that is, the phase of the output signal may reflect the change of the pressure.

For example, the first device is the tire pressure sensor installed on the automobile tire, and the monitoring parameter is the pressure. The tire pressure sensor may be configured to: monitor the pressure of the tire in real time, and reflect a change of the pressure by using the output parameter of the output signal, for example, reflect the change of the pressure by using the frequency, the phase, the amplitude, or the like of the output signal, so that serious faults such as a tire pressure loss and tire leakage can be found and warned in advance.

130: The first device reflects the output signal in response to the excitation signal, where the output parameter of the output signal is obtained based on the resonance frequency information of the tire, and the output signal is used to obtain the monitoring parameter of the tire based on the output parameter of the output signal. Correspondingly, the second device receives the output signal.

The output parameter of the output signal is obtained based on the resonance frequency information of the tire, that is, the output parameter of the reflected output signal may be determined based on the resonance frequency. Alternatively, it may be understood that the output parameter of the output signal is obtained based on the monitoring parameter related to the resonance frequency. For example, different resonance frequencies correspond to different output parameters of the output signal.

After receiving the output signal, the second device may process the output signal, and determine the monitoring parameter of the tire based on the output parameter of the output signal, for example, the frequency, the phase, or the amplitude of the output signal.

In this embodiment of this application, the first device in a passive state (for example, the tire pressure sensor manufactured based on the MASER) can transmit, based on a feature that the output signal is generated through radio frequency excitation and by using the excitation signal and the output signal, the parameters monitored in real time to the second device. For example, the output parameter (for example, the frequency, the phase, or the amplitude) of the reflected output signal is related to the resonance frequency, and the resonance frequency is related to the monitoring parameter of the tire. Therefore, the output parameter of the reflected output signal may reflect the monitoring parameter of the tire. Therefore, the second device may obtain the monitoring parameter of the tire based on the output parameter of the received output signal, and may further perform corresponding processing based on the monitoring parameter of the tire. In this manner, not only production and use costs of a monitoring system (for example, the tire pressure monitoring system) can be reduced, but also a battery does not need to be used at a monitoring end, so that reliability of the system can be enhanced.

For example, the first device that is the tire pressure sensor manufactured based on the transistor MASER. Based on features that when being excited by using the excitation signal, the MASER can reflect the output signal whose frequency is different from a frequency of the excitation signal, and the output signal can be conveniently modulated by using a specific physical quantity, a passive wireless sensor can be designed to monitor the pressure of the automobile tire. Therefore, an auxiliary battery may no longer need to be installed, and reliability and a service life of the sensor are improved.

For example, when being excited by using the excitation signal, the transistor MASER in a passive state may reflect output signals whose frequencies are different from the frequency of the excitation signal, for example, the output signals are denoted as fr and fout. Herein, fr and fout may be determined based on a design of a peripheral circuit. The periphery circuit is, for example, a capacitor or an inductor. Therefore, a physical quantity such as the pressure, the temperature, or the acceleration may be converted into a modulation quantity and modulated to fr or fout. For example, in a vehicle-mounted application, based on this feature, the parameter such as the pressure, the temperature, or the acceleration of the tire may be monitored in real time.

fout is used as an example. fout is related to a resonance frequency specified by an external circuit, that is, fout depends on the resonance frequency specified by the external circuit. In addition, the resonance frequency is related to the pressure or the like of the tire. Therefore, the physical quantity such as the pressure, the temperature, or the acceleration may be converted into the modulation quantity and modulated to fout. Specifically, the physical quantity such as the pressure, the temperature, or the acceleration affects the resonance frequency of the peripheral circuit, and fout depends on the resonance frequency of the peripheral circuit. Therefore, fout may reflect the physical quantity such as the pressure, the temperature, or the acceleration, that is, the second device may obtain the physical quantity such as the pressure, the temperature, or the acceleration based on fout.

It should be understood that this is merely an example for description, and embodiments of this application are not limited thereto. For example, the physical quantity such as the pressure, the temperature, or the acceleration may be converted into the modulation quantity and modulated to fr.

Optionally, frequencies of the excitation signal and the output signal are different.

The first device may reflect the output signal while receiving the excitation signal. It may be understood that a delay between a time point at which the second device transmits the excitation signal and a time point at which the second device receives the output signal may be almost ignored, and the time points are basically the same. Therefore, the frequencies of the excitation signal and the output signal are different. For example, a spacing between the frequencies of the output signal and the excitation signal is set, so that mutual interference between the excitation signal and the output signal can be avoided, and accuracy of a monitoring result can be improved. For example, a sufficiently large spacing between the frequencies may be set, that is, the spacing between the frequencies of the output signal and the excitation signal is large. In this way, even if the monitoring parameter affects the frequency of the output signal, because a difference between an actual frequency of the reflected output signal and a specified frequency of the output signal is not excessively large, it can be ensured that the frequency of the reflected output signal is different from the frequency of the excitation signal. Therefore, mutual interference between the excitation signal and the output signal can be avoided, and accuracy of the monitoring result can be improved.

For example, when the spacing between the frequency of the output signal and the frequency of the excitation signal is large, a duplexer may be used for isolation, so that the excitation signal and the output signal do not interfere with each other.

Optionally, when the monitoring system includes N first devices, the following two cases may be included.

Case 1: Some of the N first devices receive the excitation signal, and reflect the output signal based on the received excitation signal.

For example, the second device may reflect the excitation signal to some of the N first devices, and process the output signal reflected by some first devices.

In Case 1, the second device may excite and process only signals of some first devices based on an actual requirement, so that not only resources can be saved, but also flexibility can be improved.

Case 2: Each of the N first devices receives a first excitation signal, and reflect the output signal based on the received excitation signal.

For example, the second device may reflect the excitation signal to each of the N first devices, and process the output signal reflected by each first device.

In Case 2, the second device may excite and process a signal of each first device, to read information about each first device, so that accuracy of a monitoring result can be improved.

Optionally, when the monitoring system includes the N first devices, a plurality of implementation solutions may be included.

Solution 1: Frequencies of N excitation signals are the same, and frequencies of N output signals are different.

Solution 2: The frequencies of the N excitation signals are different, and the frequencies of the N output signals are different.

Solution 3: The frequencies of the N excitation signals are different, and the frequencies of the N output signals are the same.

Descriptions are separately described below.

In Solution 1, the frequencies of the N excitation signals are the same, and the frequencies of the N output signals are different.

To be specific, frequencies of excitation signals used to excite the N first devices are the same, and output signals of the N first devices are set at different frequencies.

For example, the excitation signals sent by the second device to the N first devices are denoted as fp, and the output signals of the N first devices are respectively denoted as fo 1, fo 2, . . . , and fo n. Herein, n=1, 2, . . . , or N. For example, fo 1, fo 2, . . . , and fo n may be fout described above.

When the monitoring system works, the second device sends the excitation signals fp. After being excited, the N first devices respectively modulate processed monitoring information to the output signals reflected by the N first devices, that is, modulate the processed monitoring information to the output signals fo 1, fo 2, . . . , and fo n. To be specific, monitoring parameters are related to a resonance frequency, and the output signals fo 1, fo 2, . . . , and fo n (that is, output parameters of fo 1, fo 2, . . . , and fo n) are related to the resonance frequency. Therefore, it may be understood that the output signals fo 1, fo 2, . . . , and fo n may reflect the monitoring parameter, or it may be understood that the output signals fo 1, fo 2, . . . , and fo n are determined based on the monitoring parameters monitored by the first devices. The second device may simultaneously receive the signals fo 1, fo 2, . . . , and fo n, and read, by processing each output signal, information transmitted by each first device by using the output signal.

It may be understood that, based on Solution 1, a same excitation signal may be used for excitation at a same moment, and information (for example, information about a parameter such as pressure or temperature) monitored by the first devices is simultaneously read.

Figure 2:
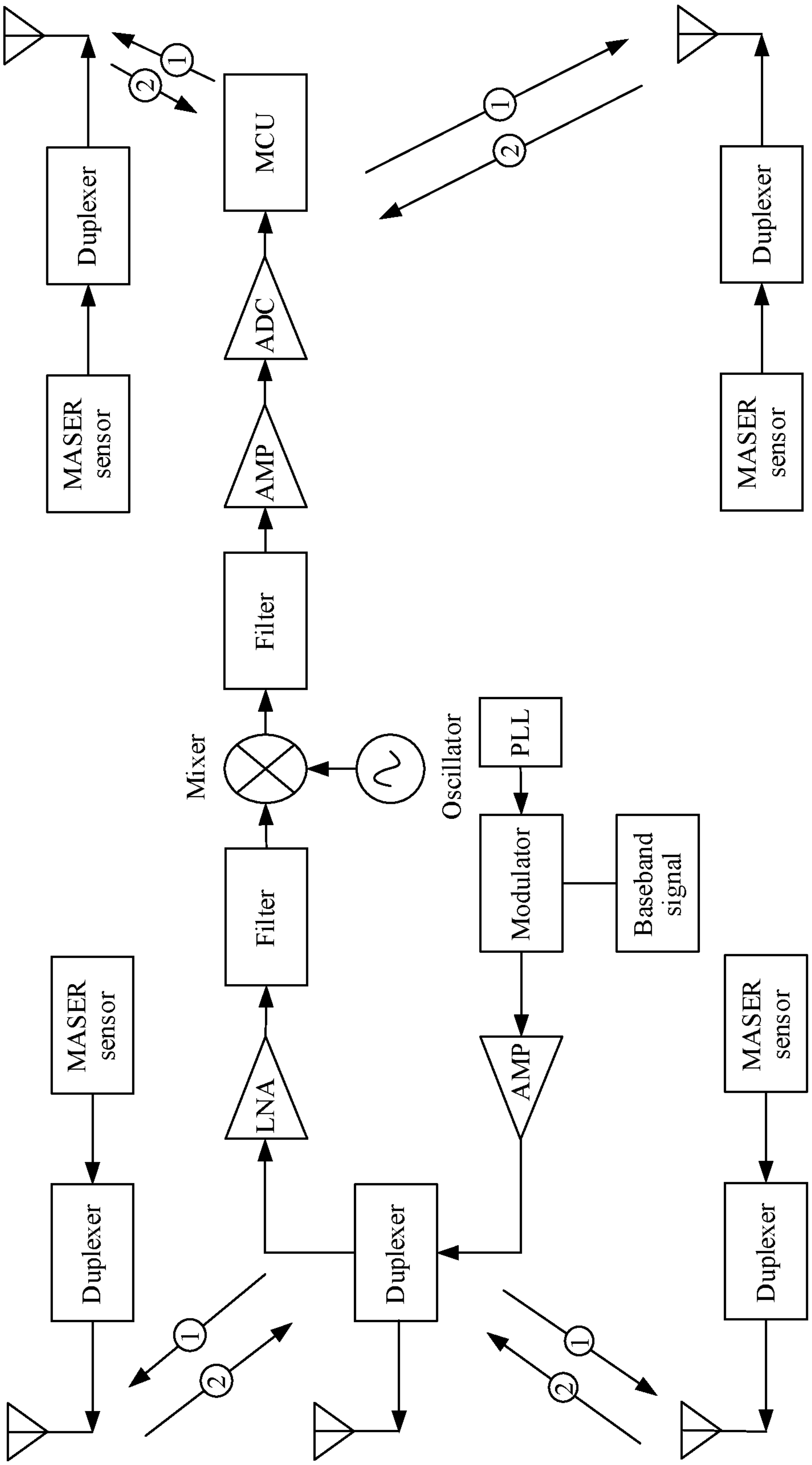
FIG. 2 is a schematic diagram of a tire parameter monitoring method to which an embodiment of this application is applicable.

FIG. 2 shows a specific example.

As shown in FIG. 2, it is assumed that the system includes four first devices and one second device. The first devices each are, for example, a tire pressure sensor manufactured based on a transistor MASER. For example, the four tire pressure sensors may be respectively installed on four tires of an automobile.

As shown in FIG. 2, ① indicates that the second device sends an excitation signal fp, and ② indicates that the second device reads information about an output signal reflected by a first device.

As shown in FIG. 2, the second device may send an excitation signal fp 1 to the four tire pressure sensors at a same moment. The second device simultaneously reads information about output signals reflected by the first devices. For example, the second device may simultaneously read the following information: information about an output signal fo 1 reflected by a sensor installed on a first tire, information about an output signal fo 2 reflected by a sensor installed on a second tire, information about an output signal fo 3 reflected by a sensor installed on a third tire, and information about an output signal fo 4 reflected by a sensor installed on a fourth tire.

Optionally, in Solution 1, the second device can process a multicarrier signal, and has a strong processing capability.

Based on Solution 1, excitation signals having a same frequency and output signals having different frequencies are used, that is, the frequencies of the output signals of the first devices may be different. Therefore, processing can be performed simultaneously without interfering with each other, to improve a reading speed. A tire of an automobile is used as an example. The automobile has a plurality of tires. In this implementation, it can be ensured that sensor information of the plurality of tires is read at a fast speed.

In Solution 2, the frequencies of the N excitation signals are different, and the frequencies of the N output signals are different.

To be specific, frequencies of excitation signals used to excite the N first devices are different, and output signals of the N first devices are set at different frequencies.

For example, the excitation signals sent by the second device to the N first devices are respectively denoted as fp 1, fp 2, . . . , and fp n, and the output signals of the N first devices are respectively denoted as fo 1, fo 2, . . . , and fo n.

When the monitoring system works, the second device sends the excitation signals to the first devices, and correspondingly excited first devices respectively reflect the output signals.

For example, the second device sends the excitation signal fp 1 to a first device, and the first device modulates monitoring information to the output signal fo 1 and reflects the output signal fo 1. To be specific, a monitoring parameter is related to a resonance frequency, and the output signal fo 1 (that is, an output parameter of fo 1) is related to the resonance frequency. Therefore, it may be understood that the output signal fo 1 may reflect the monitoring parameter, or it may be understood that the output signal fo 1 is determined based on the monitoring parameter monitored by the first device. After receiving the output signal fo 1, the second device obtains, through processing, the information monitored by the first device.

For another example, the second device sends the excitation signal fp 2 to another first device, and the first device modulates monitoring information to the output signal fo 2 and reflects the output signal fo 2. To be specific, a monitoring parameter is related to a resonance frequency, and the output signal fo 2 (that is, an output parameter of fo 2) is related to the resonance frequency. Therefore, it may be understood that the output signal fo 2 may reflect the monitoring parameter, or it may be understood that the output signal fo 2 is determined based on the monitoring parameter monitored by the first device. After receiving the output signal fo2, the second device obtains, through processing, the information monitored by the first device, and the like.

In a possible implementation, monitoring information of first devices may be read in a time division manner.

Figure 3:
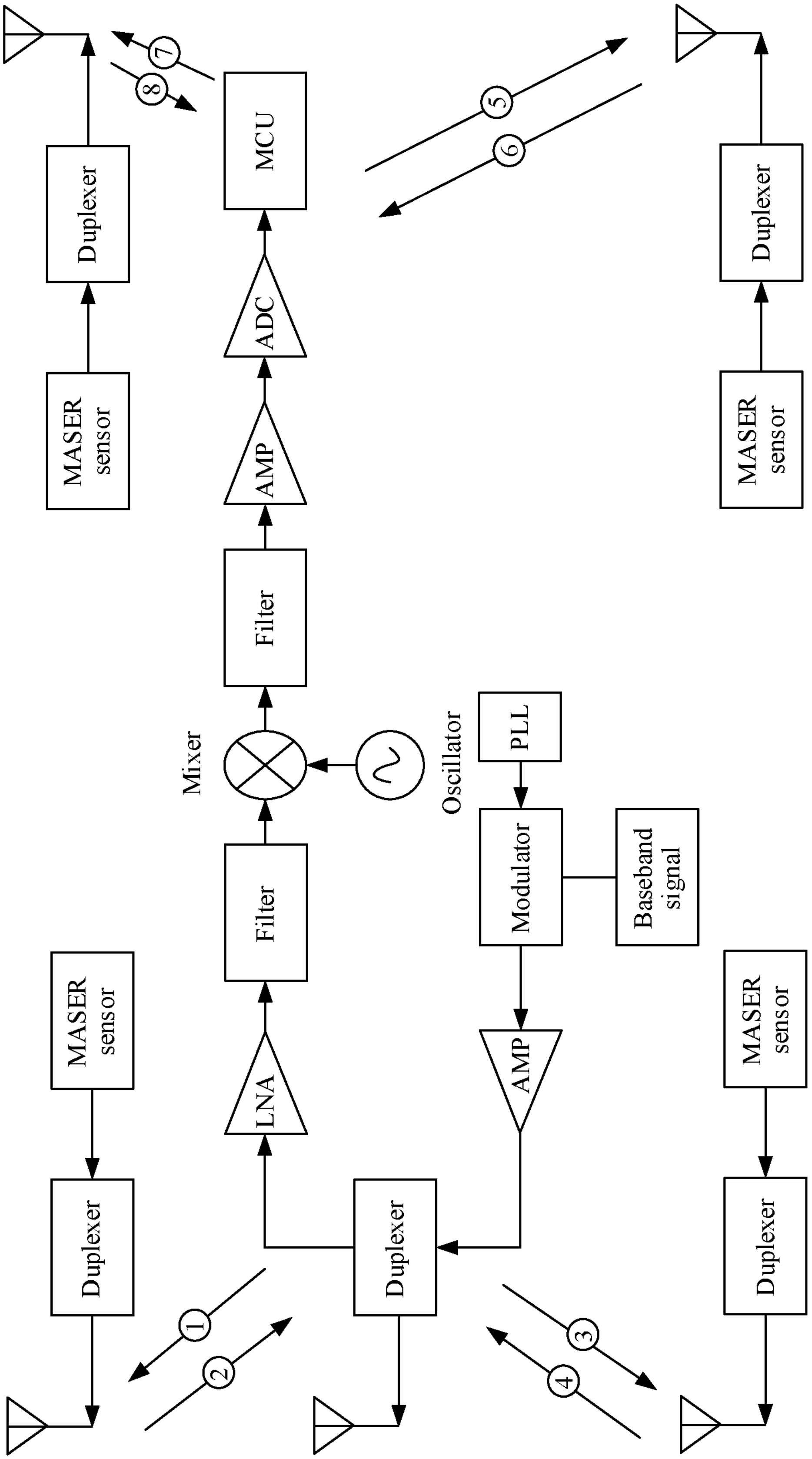
FIG. 3 is a schematic diagram of a tire parameter monitoring method to which another embodiment of this application is applicable.

FIG. 3 shows a specific example.

As shown in FIG. 3, it is assumed that the system includes four first devices and one second device. The first devices each are, for example, a tire pressure sensor manufactured based on a transistor MASER. For example, the four tire pressure sensors may be respectively installed on four tires of an automobile.

As shown in FIG. 3, ① indicates that the second device sends an excitation signal fp 1, and ② indicates that the second device reads information about an output signal fo 1 reflected by a first device (for example, a sensor installed on a first tire). ③ indicates that the second device sends an excitation signal fp 2, and ④ indicates that the second device reads information about an output signal fo 2 reflected by a first device (for example, a sensor installed on a second tire). ⑤ indicates that the second device sends an excitation signal fp 3, and 0 indicates that the second device reads information about an output signal fo 3 reflected by a first device (for example, a sensor installed on a third tire). ⑦ indicates that the second device sends an excitation signal fp 4, and ⑧ indicates that the second device reads information about an output signal fo 4 reflected by a first device (for example, a sensor installed on a fourth tire).

It can be learned from FIG. 3 that the second device may read monitoring information of the first devices in sequence.

Based on the foregoing implementation, the system is simple and easily implemented, and has a low requirement on a processing capability. In addition, the second device may read the first devices based on a requirement, that is, the second device may read the first devices in any sequence. Alternatively, the second device may excite and process, based on a requirement, only one or more signals output by one or more first devices, so that a working procedure can be set more flexibly and information can be processed more flexibly.

In another possible implementation, monitoring information of first devices may be read in a frequency division manner.

Figure 4:
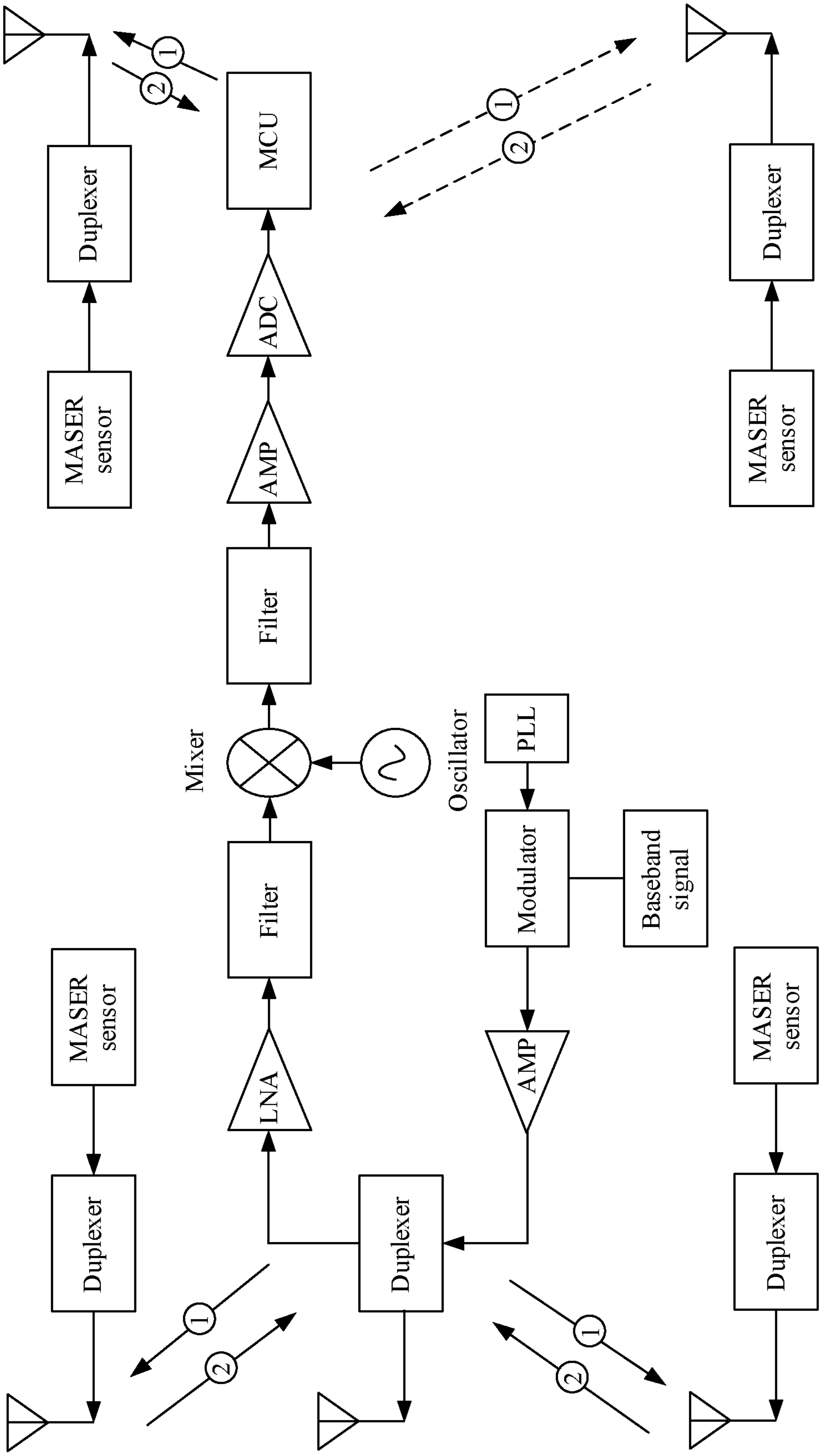
FIG. 4 is a schematic diagram of a tire parameter monitoring method to which another embodiment of this application is applicable.

FIG. 4 shows a specific example.

As shown in FIG. 4, it is assumed that the system includes four first devices and one second device. The first devices each are, for example, a tire pressure sensor manufactured based on a transistor MASER. For example, the four tire pressure sensors may be respectively installed on four tires of an automobile.

As shown in FIG. 4, ① indicates that the second device sends an excitation signal, and ② indicates that the second device reads information about an output signal reflected by a first device. To be specific, the second device may simultaneously send a multicarrier excitation signal, and may simultaneously read monitoring information of the four first devices. In FIG. 4, ① represented by a dashed line indicates that the second device does not transmit an excitation signal, and ② represented by a dashed line indicates that the second device does not read information about an output signal reflected by a first device.

Optionally, in this implementation, the transmitted excitation signal may be modulated, to simultaneously send a plurality of excitation signals.

For example, the excitation signal may be modulated based on orthogonal frequency division multiplexing (orthogonal frequency division multiplexing, OFDM). Alternatively, the excitation signal may be modulated based on discrete Fourier transform-spread-orthogonal frequency division multiplexing (discrete Fourier transform-spread-orthogonal frequency division multiplexing, DFT-s-OFDM), that is, OFDM modulation with discrete Fourier transform (discrete Fourier transform, DFT) precoding/conversion. A modulation manner is not limited in this embodiment of this application.

Optionally, in this implementation, the second device may excite and process, based on a requirement, only one or more signals output by one or more first devices, so that a working procedure can be set more flexibly and information can be processed more flexibly. Details are shown by dashed lines in FIG. 4.

Based on the foregoing implementation, the first devices, for example, the sensors on the tires, may be set to different output frequencies. In this way, the entire system can work in the frequency division manner. Excitation signals having different frequencies and output signals having different frequencies are used. Therefore, processing can be performed simultaneously without interfering with each other, to improve a reading speed.

In Solution 3, the frequencies of the N excitation signals are different, and the frequencies of the N output signals are the same.

To be specific, frequencies of excitation signals used to excite the N first devices are different, and output signals of the N first devices are set at a same frequency.

For example, the excitation signals sent by the second device to the N first devices are respectively denoted as fp 1, fp 2, . . . , and fp n, and the output signals of the N first devices are denoted as fo.

When the monitoring system works, the second device sends the excitation signals to the first devices, and correspondingly excited first devices respectively reflect the output signals. For example, the second device sends the excitation signal fp 1 to a first device, and the first device modulates monitoring information to the output signal fo and reflects the output signal fo. To be specific, a monitoring parameter is related to a resonance frequency, and the output signal fo (that is, an output parameter of fo) is related to the resonance frequency. Therefore, it may be understood that the output signal fo may reflect the monitoring parameter, or it may be understood that the output signal fo is determined based on the monitoring parameter monitored by the first device. After receiving the output signal fo, the second device obtains, through processing, the information monitored by the first device.

For another example, the second device sends the excitation signal fp 2 to another first device, and the first device modulates monitoring information to the output signal fo and reflects the output signal fo. To be specific, a monitoring parameter is related to a resonance frequency, and the output signal fo (that is, an output parameter of fo) is related to the resonance frequency. Therefore, it may be understood that the output signal fo may reflect the monitoring parameter, or it may be understood that the output signal fo is determined based on the monitoring parameter monitored by the first device. After receiving the output signal fo, the second device obtains, through processing, the information monitored by the first device, and the like.

In a possible implementation, monitoring information of first devices may be read in a time division manner.

As shown in FIG. 3, ① indicates that the second device sends an excitation signal fp 1, and ② indicates that the second device reads information about an output signal fo reflected by a first device (for example, a sensor installed on a first tire). ③ indicates that the second device sends an excitation signal fp 2, and ④ indicates that the second device reads information about an output signal fo reflected by a first device (for example, a sensor installed on a second tire). ⑤ indicates that the second device sends an excitation signal fp 3, and ⑥ indicates that the second device reads information about an output signal fo reflected by a first device (for example, a sensor installed on a third tire). ⑦ indicates that the second device sends an excitation signal fp 4, and ⑧ indicates that the second device reads information about an output signal fo reflected by a first device (for example, a sensor installed on a fourth tire).

Based on Solution 3, the system is simple and easily implemented, and has a low requirement on a processing capability. In addition, the second device may read the first devices based on a requirement, that is, the second device may read the first devices in any sequence.

It should be understood that the foregoing several solutions are merely possible implementations, and embodiments of this application are not limited thereto. For example, a plurality of first devices may also work in the time division manner when excitation signals having a same frequency and output signals having a same frequency are set.

Figure 5:
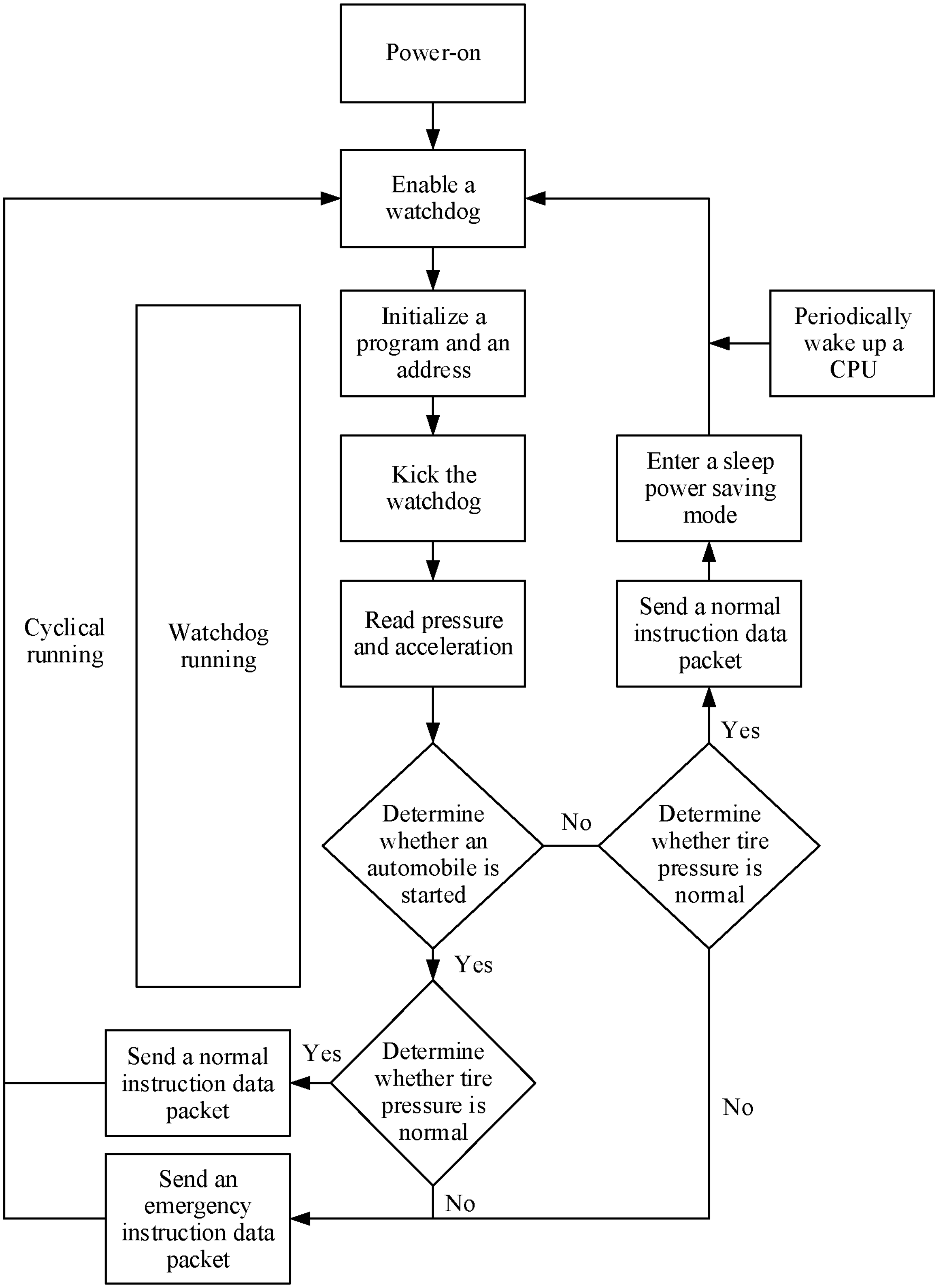
FIG. 5 is a schematic flowchart of a tire parameter monitoring method to which an embodiment of this application is applicable.

For ease of understanding, the following describes a possible schematic procedure with reference to FIG. 5 and a scenario in which automobile tire pressure is monitored.

Power-on is started and a watchdog is enabled. For example, a central processing unit (central processing unit, CPU) may be woken up periodically to enable the watchdog. A program and an address are initiated, and the watchdog is kicked. Pressure and acceleration are read, and whether an automobile is started is detected.

When the automobile is started, whether tire pressure is normal can be monitored. In this process, monitoring may be performed by using the method 100 described above. For example, a passive tire pressure sensor (that is, an example of the foregoing first device) manufactured based on a MASER is installed on each tire. After being excited, the passive tire pressure sensor processes and converts pressure information into a modulation quantity, and modulates the modulation quantity to a reflected output signal. An automobile body unit reads the output signal, and determines whether the tire pressure is normal. If the tire pressure is normal, a normal instruction data packet is sent. If the tire pressure is abnormal, an emergency instruction data packet is sent. In addition, cyclical running is performed, so that whether the tire pressure is normal can be monitored in real time, to improve driving safety.

When the automobile is not started, whether the tire pressure is normal can also be monitored. In this process, monitoring may be performed by using the method 100 described above. For example, a passive tire pressure sensor (that is, an example of the foregoing first device) manufactured based on a MASER is installed on each tire. After being excited, the passive tire pressure sensor processes and converts pressure information into a modulation quantity, and modulates the modulation quantity to a reflected output signal. An automobile body unit reads the output signal, and determines whether the tire pressure is normal. If the tire pressure is normal, a normal instruction data packet is sent, and a sleep power saving mode may be entered. If the tire pressure is abnormal, an emergency instruction data packet is sent. In addition, cyclical running is performed, so that whether the tire pressure is normal can be monitored in real time, to improve driving safety.

It should be understood that the foregoing describes, with reference to FIG. 5, an example of the scenario in which the automobile tire pressure is monitored. Embodiments of this application are not limited thereto. For example, embodiments of this application may be further applied to another scenario in which pressure of a moving object needs to be monitored.

It should be further understood that in some of the foregoing embodiments, an example in which the first device is the tire pressure sensor on the tire is used for description. Embodiments of this application are not limited thereto. Embodiments of this application may be applied to any scenario in which a parameter needs to be monitored in real time.

In embodiments of this application, the first device is excited by using the excitation signal, the first device reflects the output signal, and the first device modulates the monitoring parameter to the reflected output signal. To be specific, the output parameter of the output signal reflected by the first device is determined based on the monitoring parameter. For example, the first device monitors a monitoring parameter of a tire, determines a resonance frequency based on the monitored monitoring parameter, and determines the output parameter of the output signal based on the resonance frequency. Therefore, the second device may obtain the monitoring parameter based on the output signal reflected by the first device, that is, based on the output parameter of the output signal reflected by the first device. Therefore, not only passive monitoring can be implemented, but also reliability can be improved, and production and use costs of the monitoring system can be reduced.

In embodiments of this application, the second device may communicate with a plurality of second devices once in a data reading process, to simultaneously read data, and improve monitoring efficiency. Alternatively, the second device may excite and process, based on a requirement, only one or more signals output by one or more first devices, so that a working procedure can be set more flexibly and information can be processed more flexibly.

In addition, in some embodiments, based on a feature that when being excited by using the excitation signal, the transistor MASER in a passive state can generate the output signal, and a feature that the output signal can be conveniently modulated by using a specific physical quantity, the tire pressure sensor may be manufactured based on the MASER. Therefore, reliability of the tire pressure sensor can be improved, and the tire pressure sensor can better adapt to a harsh working environment of the tire.

In addition, frequencies of output signals of a plurality of MASERs may be conveniently set to different frequencies, so that tire pressure sensors on tires can be set to different output frequencies. In this way, the entire system can work in a frequency division manner. When excitation signals having a same frequency or excitation signals having different frequencies are used, because frequencies of output signals of the tire pressure sensors may be different, processing can be performed simultaneously without interfering with each other. In addition, a plurality of tire pressure sensors may also work in a time division manner when excitation signals having a same frequency and output signals having a same frequency are set.

Embodiments described in this specification may be independent solutions, or may be combined based on internal logic. These solutions all fall within the protection scope of this application.

It may be understood that in the foregoing method embodiments, methods and operations implemented by a device may alternatively be implemented by a component (for example, a chip or a circuit) that may be used in the device. For example, the methods and operations implemented by a first device (for example, a tire pressure sensor) may alternatively be implemented by a component (for example, a chip or a circuit) that may be used in the first device. For another example, the methods and operations implemented by a second device may alternatively be implemented by a component (for example, a chip or a circuit) that may be used in the second device.

Apparatuses provided in embodiments of this application are described below in detail with reference to FIG. 6 to FIG. 10. It should be understood that descriptions of apparatus embodiments correspond to the descriptions of the method embodiments. Therefore, for content that is not described in detail, refer to the foregoing method embodiments. For brevity, details are not described herein again.

In embodiments of this application, the first device or the second device may be divided into functional modules based on the foregoing method examples. For example, each functional module may be obtained through division based on corresponding functions, or two or more functions may be integrated into one processing module. The integrated module may be implemented in a form of hardware, or may be implemented in a form of a software functional module. It should be noted that, in embodiments of this application, division into the modules is an example, is merely logical function division, and may be other division in an actual implementation. An example in which each functional module is obtained through division based on each corresponding function is used below for description.

Figure 6:
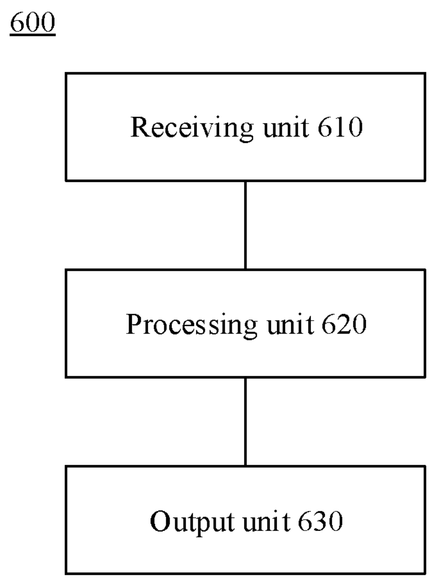
FIG. 6 is a schematic diagram of a tire parameter monitoring apparatus according to an embodiment of this application.

FIG. 6 is a schematic block diagram of a tire parameter monitoring apparatus according to an embodiment of this application. As shown in the figure, the apparatus 600 includes a receiving unit 610, a processing unit 620, and an output unit 630.

In a possible design, the apparatus 600 may implement the steps or the procedures performed by the first device in the foregoing method embodiments, for example, may be a tire pressure sensor, or a chip or a circuit configured in the first device. The receiving unit 610 (or may be referred to as an input unit) is configured to perform a receiving-related operation on the first device side in the foregoing method embodiments. The processing unit 620 (or may be referred to as a modulation unit) is configured to perform a processing-related operation on the first device side in the foregoing method embodiments. The output unit 630 (or may be referred to as a reflection unit) is configured to perform a reflection-related operation of the first device in the foregoing method embodiments. For example, the input unit and the output unit may be implemented by using one circuit, or each may be implemented by using one circuit. This is not limited herein.

In a possible implementation, the receiving unit 610 is configured to receive an excitation signal. The processing unit 620 is configured to obtain resonance frequency information of a tire, where the resonance frequency information of the tire is related to a monitoring parameter of the tire. The output unit 630 is configured to reflect an output signal in response to the excitation signal, where an output parameter of the output signal is obtained based on the resonance frequency information of the tire, and the output signal is used to obtain the monitoring parameter of the tire based on the output parameter of the output signal.

Optionally, the output parameter of the output signal may include one or more of the following: a frequency of the output signal, an amplitude of the output signal, and a phase of the output signal.

Optionally, the resonance frequency information of the tire is obtained based on the monitoring parameter that is of the tire and that is monitored by a pressure sensitive element.

Optionally, frequencies of the output signal and the excitation signal are different.

Optionally, the monitoring parameter of the tire includes one or more of the following: pressure, temperature, and acceleration.

The apparatus 600 may implement the steps or the procedures performed by the first device in FIG. 1 to FIG. 5 according to embodiments of this application, and the apparatus 600 may include units configured to perform the method performed by the first device in the method 100 in FIG. 1. In addition, the units in the apparatus 600 and the foregoing other operations and/or functions are separately intended to implement corresponding procedures in the method 100 in FIG. 1.

It should be understood that a specific process in which the units perform the foregoing corresponding steps is described in detail in the foregoing method embodiments. For brevity, details are not described herein again.

In another possible design, the apparatus 600 may implement the steps or the procedures performed by the second device in the foregoing method embodiments, for example, may be a tire pressure sensor, or a chip or a circuit configured in the second device. The receiving unit 610 is configured to perform a receiving-related operation on the second device side in the foregoing method embodiments. The processing unit 620 is configured to perform a processing-related operation on the second device side in the foregoing method embodiments. The output unit 630 is configured to perform a sending-related operation of the second device in the foregoing method embodiments. For example, the receiving unit and the reflection unit may be implemented by using one circuit, or each may be implemented by using one circuit. This is not limited herein.

In a possible implementation, the receiving unit 610 is configured to receive an output signal. The processing unit 620 is configured to obtain a monitoring parameter of a tire based on an output parameter of the output signal, where the output parameter of the output signal is obtained based on resonance frequency information of the tire, and the resonance frequency information of the tire is related to the monitoring parameter of the tire.

Optionally, the output parameter of the output signal may include one or more of the following: a frequency of the output signal, an amplitude of the output signal, and a phase of the output signal.

Optionally, the monitoring parameter of the tire includes one or more of the following: pressure, temperature, and acceleration.

Optionally, the output unit 630 is configured to output an excitation signal.

The apparatus 600 may implement the steps or the procedures performed by the second device in FIG. 1 to FIG. 5 according to embodiments of this application, and the apparatus 600 may include units configured to perform the method performed by the second device in the method 100 in FIG. 1. In addition, the units in the apparatus 600 and the foregoing other operations and/or functions are separately intended to implement the corresponding procedures in the method 100 in FIG. 1.

It should be understood that a specific process in which the units perform the foregoing corresponding steps is described in detail in the foregoing method embodiments. For brevity, details are not described herein.

Figure 7:
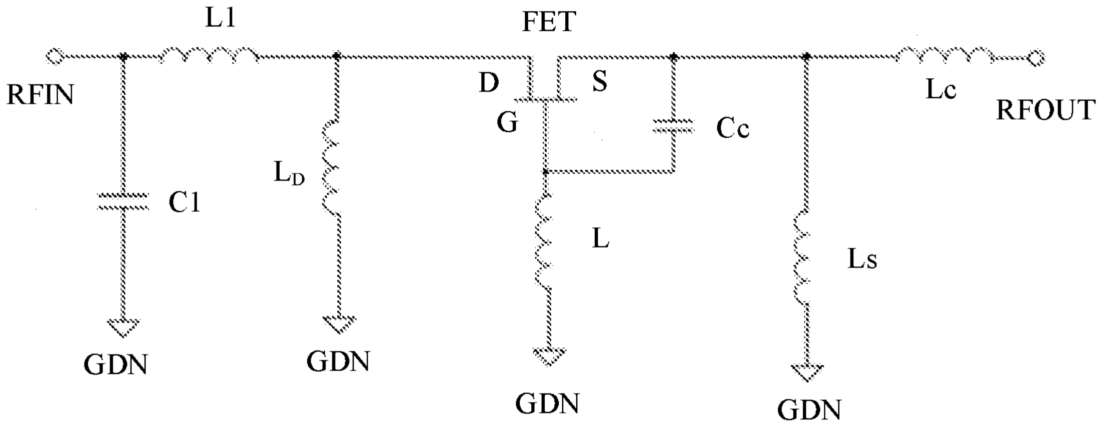
FIG. 7 is a schematic diagram of a tire parameter monitoring apparatus according to another embodiment of this application.
Figure 8:
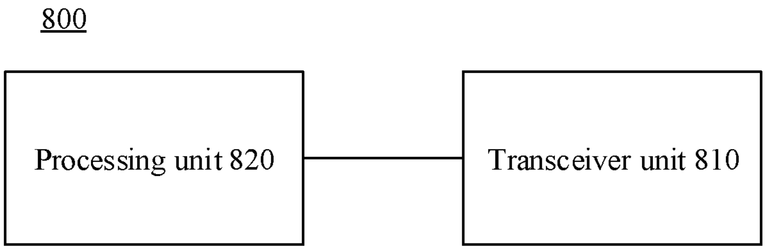
FIG. 8 is a schematic diagram of a first device according to an embodiment of this application.
Figure 9:
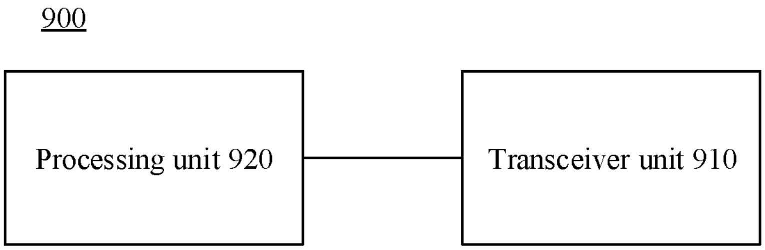
FIG. 9 is a schematic diagram of a second device according to an embodiment of this application.

FIG. 7 is a schematic block diagram of another tire parameter monitoring apparatus according to an embodiment of this application. The apparatus may be, for example, a tire pressure sensor installed on an automobile tire. For example, the tire pressure sensor may be integrated inside the tire, for example, near a valve core, that is, a location at which air is contained inside the tire, and is no longer exposed, so that a loss and damage can be avoided. It should be understood that a specific location of the tire pressure sensor is not limited in this application.

In a possible design, as shown in FIG. 7, an excitation signal may be received by an antenna and then input from a radio frequency (radio frequency, RF) signal input interface (RFIN) end, to generate output signals fr and fout. For ease of description, only fout, that is, RFOUT, is displayed in FIG. 7. Frequencies of the generated signals fr and fout may be determined based on parameters (for example, an inductance value of an inductor L and a capacitance value of a capacitor Cc) of a peripheral circuit and parameters of a used transistor. A field effect transistor (field effect transistor, FET) shown in FIG. 7 is the transistor. The capacitance value of the capacitor or the inductance value of the inductor changes as pressure changes. In this way, the change of the pressure can be modulated to a frequency of an output signal. Similarly, a pressure sensitive circuit element is modulated, that is, a change of monitored pressure, temperature, or the like may be modulated to an output parameter of an output signal of a transistor MASER. For example, the output parameter may include but is not limited to a frequency, an amplitude, a phase, or a combination of the foregoing several parameters.

It should be understood that FIG. 7 is merely an example diagram, and does not limit the protection scope of embodiments of this application. Any variation belonging to the apparatus 700 falls within the protection scope of embodiments of this application.

An embodiment of this application further provides an apparatus 800. The apparatus 800 may be a first device, or a circuit or a chip. The apparatus 800 may be configured to perform the actions performed by the first device in the foregoing method embodiments.

In a possible design, the apparatus 800 may include a transceiver unit 810 and a processing unit 820. The transceiver unit 810 may also be referred to as a transceiver machine, a transceiver, or the like. The transceiver unit 810 includes an antenna and a radio frequency unit, and the radio frequency unit is mainly configured to perform radio frequency processing. Optionally, a component that is in the transceiver unit 810 and that is configured to implement a receiving function may be considered as a receiving unit, and a component that is in the transceiver unit 810 and that is configured to implement a sending function may be considered as a sending unit. In other words, the transceiver unit 810 includes the receiving unit and the sending unit. The receiving unit may also be referred to as a receiver machine, a receiver, a receiver circuit, or the like, and the sending unit may be referred to as a transmitter machine, a transmitter, a transmitter circuit, or the like. The processing unit 820 may include one or more boards, and each board may include one or more processors and one or more memories. The processor is configured to: read and execute a program in the memory to implement a baseband processing function and control the apparatus 800. If there are a plurality of boards, the boards may be interconnected to enhance a processing capability. In an optional implementation, the plurality of boards may share one or more processors, the plurality of boards share one or more memories, or the plurality of boards simultaneously share one or more processors.

For example, in an implementation, the processing unit 820 is configured to perform step 120 in the method 100, and/or the processing unit 820 is further configured to perform other processing steps on the first device side. The transceiver unit 810 is further configured to perform step 110 and step 130 in the method 100, and/or the transceiver unit 810 is further configured to perform other receiving and sending steps on the first device side.

An embodiment of this application further provides an apparatus 900. The apparatus 900 may be referred to as, for example, a tire parameter obtaining apparatus, and the apparatus 900 may be a second device, or a circuit or a chip. The apparatus 900 may be configured to perform the actions performed by the second device in the foregoing method embodiments.

In a possible design, the apparatus 900 may include a transceiver unit 910 and a processing unit 920. The transceiver unit 910 may also be referred to as a transceiver, a transceiver machine, a transceiver apparatus, or the like. The processing unit 920 may also be referred to as a processor, a processing board, a processing module, a processing apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

For example, in an implementation, the processing unit 920 is configured to perform other processing steps on the second device side in this application. The transceiver unit 910 is further configured to perform step 130 in the method 100, and/or the transceiver unit 910 is further configured to perform other receiving and sending steps on the second device side.

An embodiment of this application further provides a tire parameter monitoring system. The tire parameter monitoring system may include one or more first devices and one or more second devices. For example, the tire parameter monitoring system may include the apparatus 800 and the apparatus 900. It should be understood that a structure of the tire parameter monitoring system is not limited to structures shown in the apparatus 800 and the apparatus 900.

An embodiment of this application further provides a system 1000. The system 1000 may include one or more first devices, or the system 1000 may include one or more first devices and one or more second devices. The system 1000 may be configured to perform the actions performed by the first device and the second device in the foregoing method embodiments.

Figure 10:
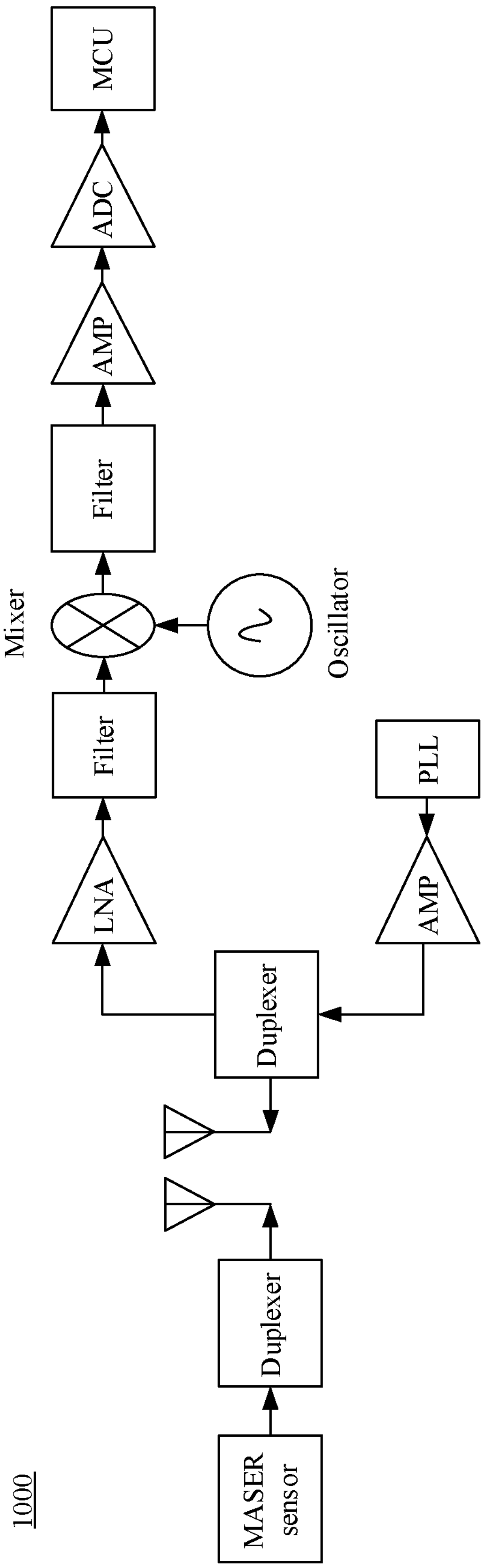
FIG. 10 is a schematic diagram of a tire parameter monitoring system according to an embodiment of this application.

When the system 1000 is a tire pressure monitoring system, FIG. 10 is a simplified schematic diagram of a structure of a transistor MASER—based passive tire pressure monitoring system.

As shown in FIG. 10, the tire pressure monitoring system may include, for example, a MASER sensor, a duplexer (Duplexer), a low noise amplifier (low noise amplifier, LNA), a filter, a mixer, an oscillator, a microcontroller unit (microcontroller unit, MCU), a phase locked loop (phase locked loop, PLL), an amplifier (amplifier, AMP), and an analog-to-digital converter (analog-to-digital converter, ADC).

In a possible implementation, after a carrier signal generated in the second device, for example, a carrier signal generated by the phase locked loop PLL, is modulated by using a baseband signal, the carrier signal may be amplified and output by the AMP, and transmitted to an antenna through the duplexer (or a switch). The transmitted signal may be received by the transistor MASER in the first device and used as an excitation signal. Excited by using the signal, the transistor MASER may generate new signals, such as fr and fout. The signals fr and fout may be determined based on parameters of a peripheral circuit of the transistor, for example, a value of a device such as a capacitor, an inductor, or a resistor. Therefore, based on this feature, a change of a physical quantity such as pressure, temperature, or acceleration may be modulated to fr and/or fout. For example, the change of the physical quantity is modulated to fout. After being transmitted, fout is received by the second device, and after being received, fout is amplified by the LNA, and then is filtered by a radio frequency filter. The filtered signal may be converted into a baseband signal through frequency mixing by the mixer (MIXER), and after being filtered by a baseband filter, the baseband signal is converted into a digital signal by the ADC for demodulation or calculation by a digital signal processing device such as the MCU or a digital signal processor (digital signal processor, DSP), to obtain a corresponding physical quantity and complete a monitoring process.

It may be understood that after receiving excitation of a radio frequency signal (for example, denoted as fp), the transistor MASER in a passive state transmits output signals (for example, fr and fout) whose frequencies are different from a frequency of fp, and then, may convert a physical quantity such as pressure, temperature, or acceleration into a modulation quantity and modulate the modulation quantity to fr and/or fout. In a vehicle-mounted application, based on this feature, the parameter such as the pressure, the temperature, or the acceleration of the tire may be monitored in real time. For details, refer to the descriptions in the foregoing method embodiments.

It should be understood that the foregoing implementation is merely an example for description, and this embodiment of this application is not limited thereto.

It should be further understood that the system 1000 shown in FIG. 10 is merely an example for description, and this embodiment of this application is not limited thereto. For example, each component included in the system 1000 may be replaced with another component that can implement a same function.

An embodiment of this application further provides a processing apparatus, including a processor and an interface. The processor may be configured to perform the methods in the foregoing method embodiments.

It should be understood that the processing apparatus may be a chip. For example, the processing apparatus may be a field programmable gate array (field programmable gate array, FPGA), an application-specific integrated circuit (application-specific integrated circuit, ASIC), a system on chip (system on chip, SoC), a central processing unit (central processing unit, CPU), a network processor (network processor, NP), a digital signal processor (digital signal processor, DSP), a micro controller unit (micro controller unit, MCU), a programmable logic device (programmable logic device, PLD), or another integrated chip.

In an implementation process, steps in the foregoing methods can be implemented by using a hardware integrated logical circuit in the processor or by using instructions in a form of software. The steps of the method disclosed with reference to embodiments of this application may be directly performed and completed by a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, steps in the foregoing method embodiments can be implemented by using a hardware integrated logical circuit in the processor or by using instructions in a form of software. The foregoing processor may be a general-purpose processor, a digital signal processor (DSP), an application-specific integrated circuit (ASIC), a field programmable gate array (FPGA) or another programmable logic device, a discrete gate, a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. By way of example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these memories and any memory of another proper type.

According to the method provided in embodiments of this application, this application further provides a computer program product. The computer program product includes computer program code, and when the computer program code is run on a computer, the computer is enabled to perform the method according to any one of the embodiments shown in FIG. 1 to FIG. 6.

According to the method provided in embodiments of this application, this application further provides a computer-readable storage medium. The computer-readable storage medium stores program code, and when the program code is run on a computer, the computer is enabled to perform the method according to any one of the embodiments shown in FIG. 1 to FIG. 6.

According to the method provided in embodiments of this application, this application further provides a system. The system includes the foregoing one or more first devices and the foregoing one or more second devices, or includes the foregoing one or more first devices.

This application further provides an automobile. The automobile includes the foregoing one or more first devices and the foregoing one or more second devices, or includes the foregoing one or more first devices.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid-state drive, SSD)), or the like.

The first device and the second device in the foregoing apparatus embodiments correspond to the first device or the second device in the method embodiments. A corresponding module or unit performs a corresponding step. For example, a communications unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

Terms such as “component”, “module”, and “system” used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As shown in the figures, both a computing device and an application that run on the computing device may be components. One or more components may reside in a process and/or an execution thread, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the internet interacting with other systems by using the signal).

A person of ordinary skill in the art may be aware that, units and algorithm steps in the examples described with reference to embodiments disclosed in this specification can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, a network device, or the like) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A tire parameter monitoring apparatus, comprising:

a transistor microwave amplification by stimulated emission of radiation (MASER), configured to receive an excitation signal; and a peripheral circuit, configured to send resonance frequency information of a tire to the transistor MASER, wherein the resonance frequency information of the tire is related to a monitoring parameter of the tire, wherein the transistor MASER is further configured to reflect an output signal in response to the excitation signal, wherein an output parameter of the output signal is obtained based on the resonance frequency information of the tire, and the output signal is used to obtain the monitoring parameter of the tire based on the output parameter of the output signal.

2. The apparatus according to claim 1, wherein the output parameter of the output signal comprises one or more of the following:

a frequency of the output signal, an amplitude of the output signal, or a phase of the output signal.

3. The apparatus according to claim 1, wherein the peripheral circuit is specifically configured to send the resonance frequency information of the tire to the transistor MASER based on the monitoring parameter that is of the tire and that is monitored by a pressure sensitive element.

4. The apparatus according to claim 1, wherein frequencies of the output signal and the excitation signal are different.

5. The apparatus according to claim 1, wherein the monitoring parameter of the tire comprises one or more of the following: pressure, temperature, or acceleration.

6. An automobile, comprising:

a tire; and a first apparatus that comprises:

a transistor microwave amplification by stimulated emission of radiation (MASER), configured to receive an excitation signal; and a peripheral circuit, configured to send resonance frequency information of the tire to the transistor MASER, wherein the resonance frequency information of the tire is related to a monitoring parameter of the tire, wherein the transistor MASER is further configured to reflect an output signal in response to the excitation signal, wherein an output parameter of the output signal is obtained based on the resonance frequency information of the tire, and the output signal is used to obtain the monitoring parameter of the tire based on the output parameter of the output signal.

7. The automobile according to claim 6, wherein the output parameter of the output signal comprises one or more of the following:

a frequency of the output signal, an amplitude of the output signal, or a phase of the output signal.

8. The automobile according to claim 6, wherein the peripheral circuit is specifically configured to send the resonance frequency information of the tire to the transistor MASER based on the monitoring parameter that is of the tire and that is monitored by a pressure sensitive element.

9. The automobile according to claim 6, wherein frequencies of the output signal and the excitation signal are different.

10. The automobile according to claim 6, wherein the monitoring parameter of the tire comprises one or more of the following: pressure, temperature, or acceleration.

11. A method, comprising:

receiving, by a transistor microwave amplification by stimulated emission of radiation (MASER), an excitation signal;

sending, by a peripheral circuit, resonance frequency information of a tire to the transistor MASER, wherein the resonance frequency information of the tire is related to a monitoring parameter of the tire;

reflecting, by the transistor MASER, an output signal in response to the excitation signal; and obtaining, an output parameter of the output signal based on the resonance frequency information of the tire, wherein the output signal is used to obtain the monitoring parameter of the tire based on the output parameter of the output signal.

12. The method of claim 11, wherein the output parameter of the output signal comprises one or more of the following:

a frequency of the output signal, an amplitude of the output signal, or a phase of the output signal.

13. The method of claim 11, comprising:

sending the resonance frequency information of the tire to the transistor MASER based on the monitoring parameter that is of the tire and that is monitored by a pressure sensitive element.

14. The method of claim 11, wherein frequencies of the output signal and the excitation signal are different.

15. The method of claim 11, wherein the monitoring parameter of the tire comprises one or more of the following: pressure, temperature, or acceleration.

* * * * *